United States Patent

[11] 3,562,641

| [72] | Inventor | Robert G. Fulks |
| | | West Concord, Mass. |
| [21] | Appl. No. | 784,995 |
| [22] | Filed | Nov. 25, 1968 |
| [45] | Patented | Feb. 9, 1971 |
| [73] | Assignee | General Radio Company |
| | | West Concord, Mass. |
| | | a corporation of Massachusetts |
| | | Continuation of application Ser. No. 454,902, May 11, 1965. |

[54] IMPEDANCE-MEASURING TRANSFORMER BRIDGE WITH AUTOMATIC DIGITAL BALANCING CIRCUIT
28 Claims, 7 Drawing Figs.

[52] U.S. Cl.................................................. 324/57, 324/99
[51] Int. Cl................................................. G01n 27/00
[50] Field of Search....................................... 324/57B, FBC2, 60B, 61B, FBC, 99D; 235/179; 73/304

[56] References Cited
UNITED STATES PATENTS

| 2,440,200 | 4/1948 | Jofeh | 324/57X |
| 2,968,180 | 1/1961 | Schafer | 324/57X |
| 2,972,106 | 2/1961 | Hyrne | 324/57 |
| 3,082,373 | 3/1963 | Hooke et al. | 324/57 |
| 3,218,863 | 11/1965 | Calvert | 324/61X |
| 3,301,056 | 1/1967 | Blanchard et al. | 73/304 |

FOREIGN PATENTS

| 1,165,701 | 10/1958 | France | 324/61 |

OTHER REFERENCES

Calvert, R. THE TRANSFORMER RATIO-ARM BRIDGE, Wayne Kerr Monograph No. 1. Page Bros (Norwich) Ltd., P. 1— 11. (copy in group 258, class 324-57)

Golding, J.F. TRANSFORMER-RATIO ARM BRIDGES, IN WIRELESS WORLD. P.329— 335, June, 1961, TK5700-W45

*Primary Examiner*—Edward E. Kubasiewicz

ABSTRACT: The present invention relates to automatic electrical bridge-balancing circuits and, more particularly, to bridge circuits, preferably of the transformer bridge type, employing alternating-current digital servo controls for effecting rapid balancing of unknown impedance elements, such as capacitances.

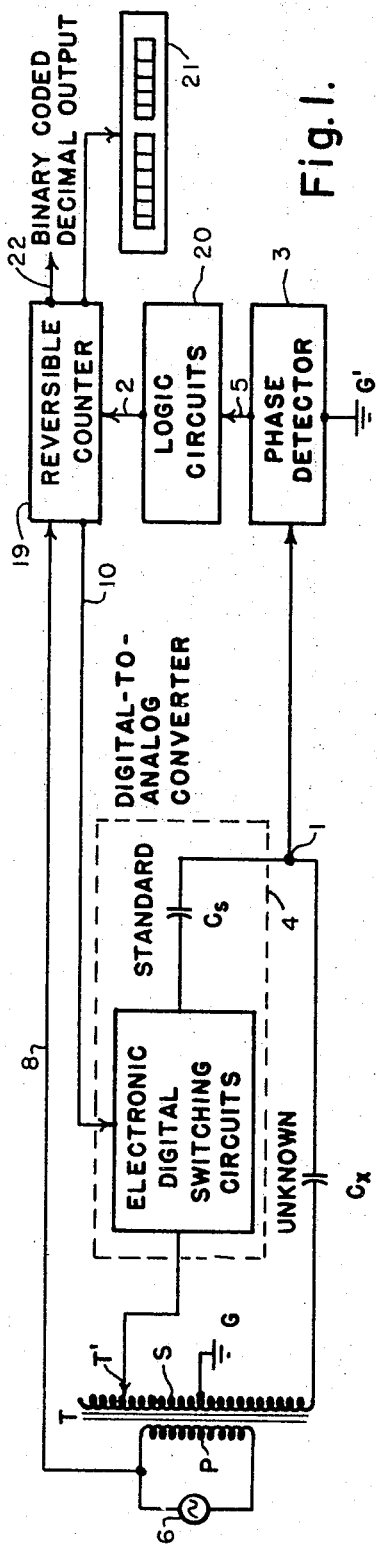
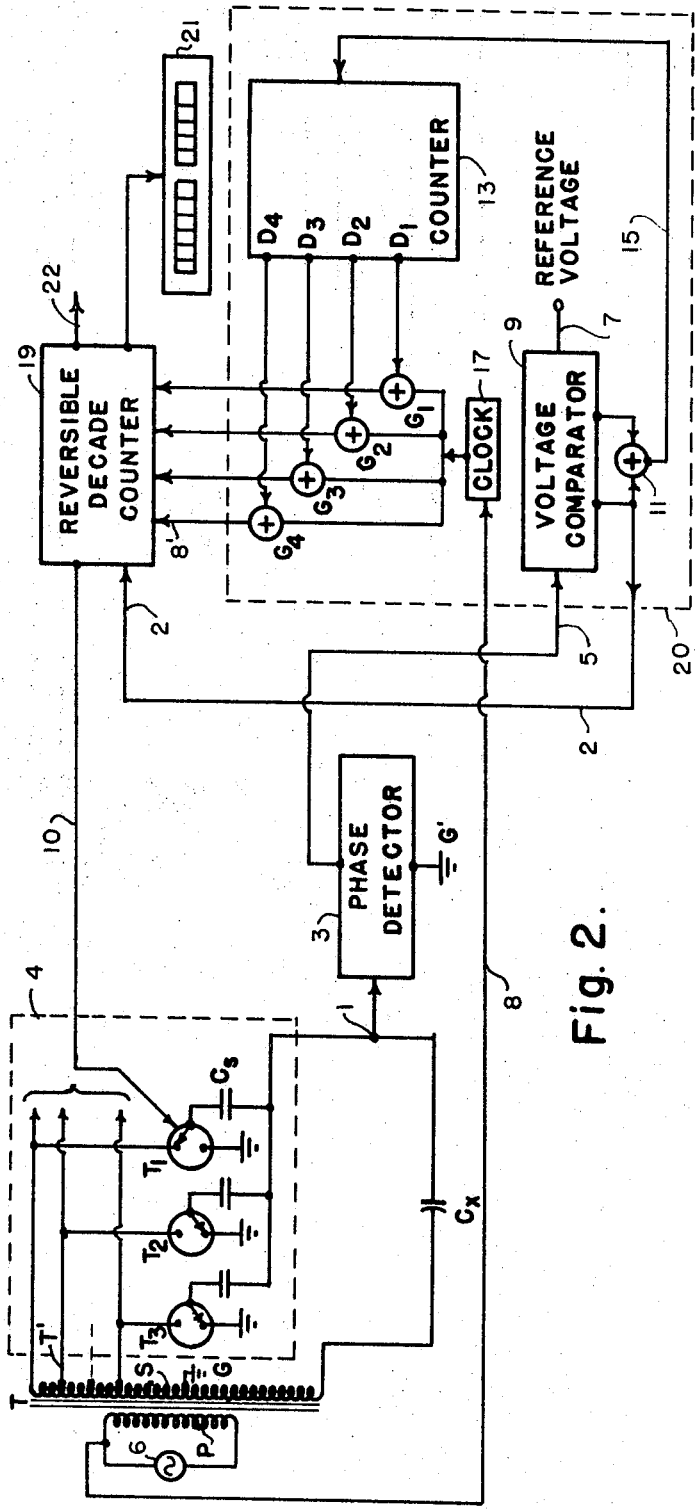
Fig. 1.
Fig. 2.
Inventor
Robert G. Fulks
by Rines and Rines.
Attorneys Inventor
Robert G. Fulks
by Rines and Rines
Attorneys

IMPEDANCE-MEASURING TRANSFORMER BRIDGE WITH AUTOMATIC DIGITAL BALANCING CIRCUIT

This application is a continuation of Ser. No. 454,902, filed May 11, 1965.

While so-called automatic self-balancing bridges have heretofore been proposed, they have generally involved circuits for the measurement of voltage, as distinguished from impedance. The provision of an automatically and rapidly self-balancing impedance-measuring bridge, however, has been a long desired goal. The present invention has met this goal with novel impedance-measurement bridge circuits employing AC digital servocontrol circuits in a unique manner to provide vastly improved efficiency and rapid automatic balancing convergence. In accordance with the invention, moreover, detected inphase and quadrature error signal components may be resolved independently to avoid "sliding nulls."

A further object of the invention is to provide a new and improved transformer ratio bridge circuit.

An additional object is to provide a novel digital control system that, while particularly advantageous for and specifically designed to operate in the digital automatic impedance bridge of the present invention, is of more general utility, as well.

Still another object is to provide a novel completely automatic capacitance and/or conductance bridge.

Other and further objects will be explained hereinafter and will be more particularly pointed out in connection with the appended claims.

The invention will now be described with reference to the accompanying drawing:

FIG. 1 of which is a combined schematic and block diagram of a bridge circuit constructed in accordance with a preferred embodiment;

FIG. 2 is a similar diagram illustrating more details of preferred logic and digital switching circuits usable in the bridge of FIG. 1;

Figure 4:
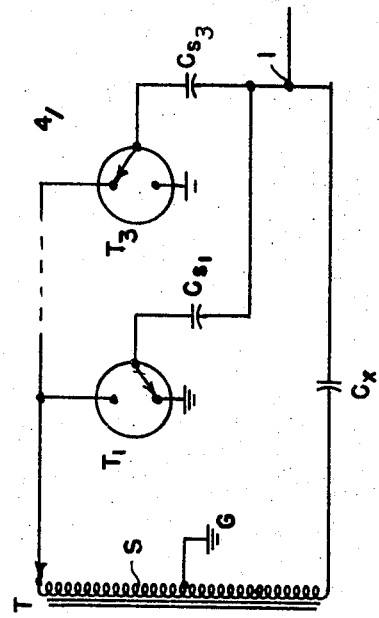
FIGS. 4 and 5 are fragmentary circuit diagrams of modified AC digital-to-analogue converter circuits.

Referring to FIG. 1, the invention is illustrated in connection with a preferred transformer-ratio-arm bridge of the general type described, for example, in the General Radio Experimenter of Aug.—Sept. 1962, Vol. 36, Nos. 8 and 9, marketed by that company under the nomenclature type 1615-A. Basically, the primary winding P of a ratiotransformer T is energized by alternating current at 6 to induce voltage in the secondary winding S, shown intermediately connected to ground G, with the upper and lower portions of the winding S serving as bridge arms. The remaining bridge-arm components are illustrated as an unknown capacitor $C_x$ and a standard known capacitor $C_s$.

The bridge is in balance when the currents through the standard capacitor $C_s$ and the unknown capacitor $C_x$ are equal, so that the current at 1, fed to a phase detector 3, is zero. The phase detector 3 is connected between bridge vertex 1 and, by ground connection G', to the opposite vertex G. The phase detector 3 determines whether the current passing through the unknown arm $C_x$ of the bridge is higher or lower than that through the standard arm, and produces an AC error signal, which indicates whether more or less voltage is required on the standard capacitor to reach a balance. More or less voltage is shown achieved by different secondary tap positions (schematically shown as a variable tap T' in FIG. 1) under control of electronic digital switching circuits comprising, with the standard capacitor $C_s$, an AC digital-to-analogue converter 4, later explained. This error signal information is processed by later-described logic circuits 20 and is used by a reversible counter 19, which controls at 10 through the electronic switching circuits, the voltage on the standard capacitor. The counter counts in a direction to minimize the error signal until balance is reached. At balance, the value of the unknown $C_x$ is displayed on an in-line digital readout 21, which indicates, for example, capacitance units. This information is also presented in binary-coded-decimal form at 22 for use with printers and other data-handling equipment.

The digital automatic impedance bridge of the present invention, thus, employs digital logic circuits for accepting AC error signals and changing the state of switching circuits in such a way as to convert digital control signals to a current or voltage for balancing a corresponding current or voltage from the unknown impedance, to minimize the error signals. In the embodiment of FIG. 1, the digital electronic switching circuits at 4 effectively change the tap at T' on the transformer secondary S, feeding a current into the phase detector 3 that is the analogue of the digital signal from the logic-memory circuit 19—20 and automatically selecting that tap position that produces a balancing or null condition at 1. The particular combination of reversible counter 19 and digital switching circuits in the digital-to-analogue converter 4 is a preferred system, though equivalent logic circuits may also be employed to serve similar functions, as is known.

An illustrative example of particularly desirable logic circuitry 20 and tap-changing switching circuits at 4 is shown in FIG. 2, wherein successive fixed taps T', constituting different voltage weighting, are connected through corresponding switches $T_1, T_2...T_3$ to similar standard capacitors $C_s$, the switches being shown schematically, but preferably of the transistor or electronic type hereinafter described in connection with the detail of FIG. 3.

Under circumstances of unbalance, DC in-phase voltage results in the output of the phase detector 3 and is applied along path 5 to a voltage comparator 9, included within the logic circuit system 20, and other components of which are hereinafter delineated, for comparison with a reference voltage applied a 7, such as ground potential. The phase detector 3 may be of any suitable conventional type, and the voltage comparator 9 may assume the form, for example, of the circuit described in the General Radio Experimenter of Dec. 1958, Vol. 32, No. 19, page 9. At unbalance, either the phase detector output signal at 5 is higher or lower than the reference voltage, producing a direct-current error signal output from an "or" gate 11 that may be applied to control a counter 13 by input conductor 15. The counter 13 is schematically shown provided with four conventional states $D_1, D_2, D_3$ and $D_4$ that will enable corresponding respective "and" gates $G_1, G_2, G_3$ and $G_4$ to permit clock pulses from a timing generator 17 (synchronized at 8 from the source 6) to feed corresponding decade inputs at 8' of the reversible decade counter 19. The reversible counter 19, for example, may be of the type described in copending application, Ser. No. 233,563 of Richard W. Frank, filed Oct. 29, 1962 and entitled "Reversible Counter"; or of other desired configuration. In order to indicate higher or lower voltage output from the voltage comparator 9 and thus the direction of unbalance and the direction that the reversible counter 19 should count, a DC direction-indicating control voltage is applied at 2 to the reversible counter 19. If the unbalance control signal is such that the count is higher than that required for a balance, the counter 19 will be caused to count backward; and vice versa.

At unbalance, counter 13 is initially set to state $D_1$ enabling gate $G_1$ to permit pulses from the clock or timing generator 17 to feed the most significant decade of reversible counter 19 along 8', as, for example, of the type described in the said copending Frank application. The most significant decade continues to count until it counts past the balance point so that the phase of the error signal at once reverses. This change in phase causes a change in state of the output of the voltage comparator 9, which is applied through OR gate 11, and input conductor 15 to counter 13, causing it to count to state $D_2$ and thus enabling gate $G_2$. This permits clock pulses to feed the next most significant digit. Further changes in state of the comparator 9 cause control of the counter similarly to advance to states $D_3$ and $D_4$, enabling gates $G_3$ and $G_4$, respectively, to feed clock pulses to increasingly less significant digits of counter 19. The counter 19 contains the normal "carry" paths from each decade to the next most significant decade so that higher order digits can be changed both as a result of pulses through its respective gates ($G_1$ through $G_4$) and carries from the next least significant digit. This feature and the use of the reversible counter thus considerably simplifies the balance conversion.

The output 10 of reversible counter 19, indicating the direction of counting and thus the direction of required correction of tap position on the transformer secondary S, may control the alternating-current digital-to-analogue converter 4, schematically illustrated in FIG. 2 by the connection to the switch $T_1$. That tap position T' is thus automatically successively sought, as the appropriate switches of the plurality of similar switching devices $T_1$, $T_2$...$T_3$, etc., are successively switched, to effect variations of voltage ratios in the arms, that converge upon bridge balance. The count in the reversible counter 19 is directly proportional to the current fed into the standard $C_s$ through the appropriately operated switching device associated with the appropriate transformer tap position T', which current, at balance, equals the current in the bridge through the unknown $C_x$. The digital-to-analogue converter 4 thus accepts the digital signal and produces, through its switching action, a current through the standard capacitor $C_s$ which is the analogue of the count in the reversible counter.

Figure 3:
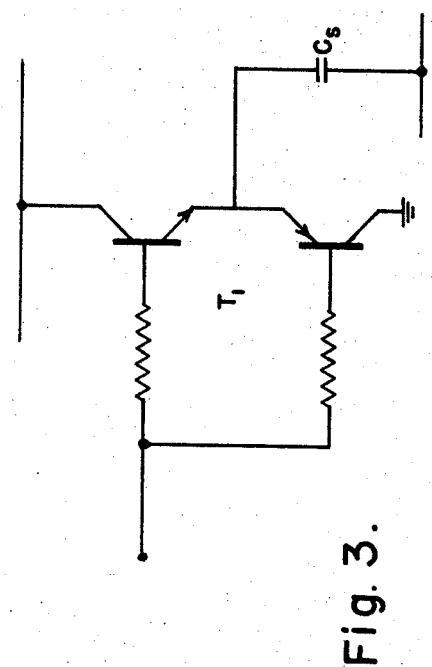
FIG. 3 is a circuit diagram of preferred transistor switching elements that may be employed in the digital-to-analogue converter switching circuits of FIGS. 1 and 2.

The devices $T_1$, $T_2$...T3, etc., may, for example, be of the two-stage parallel-fed base and common emitter output transistor type shown in FIG. 3 in connection with the stage $T_1$. Fast balancing convergence is thus attained with this digital-to-analogue AC conversion method of varying the effective value of the bridge standard.

While variable voltage from various tap positions is the mode of current variation through the standards $C_s$ in FIGS. 1 and 2, this is but one way of achieving this result. In FIG. 4, as another example, instead of a plurality of similar standard capacitors $C_s$, each fed with a different voltage, as in the embodiment of FIG. 2, a plurality of successively different-valued capacitors $C_{s1}$...$C_s$ah3, etc. is provided, with a common connection of the switching devices $T_1$...$T_3$, etc. to the upper terminal of the secondary winding S. This circuit enables switching different-valued capacitors (each one double its predecessor in value, for example) into the upper bridge arm, automatically to converge on the balance condition. Alternatively, a single standard capacitor $C_s$ may be employed, as in the embodiment of FIG. 5, with the current through it varied in accordance with the operation of the switching devices $T_1$, $T_2$...$T_3$, etc.

Figure 5:
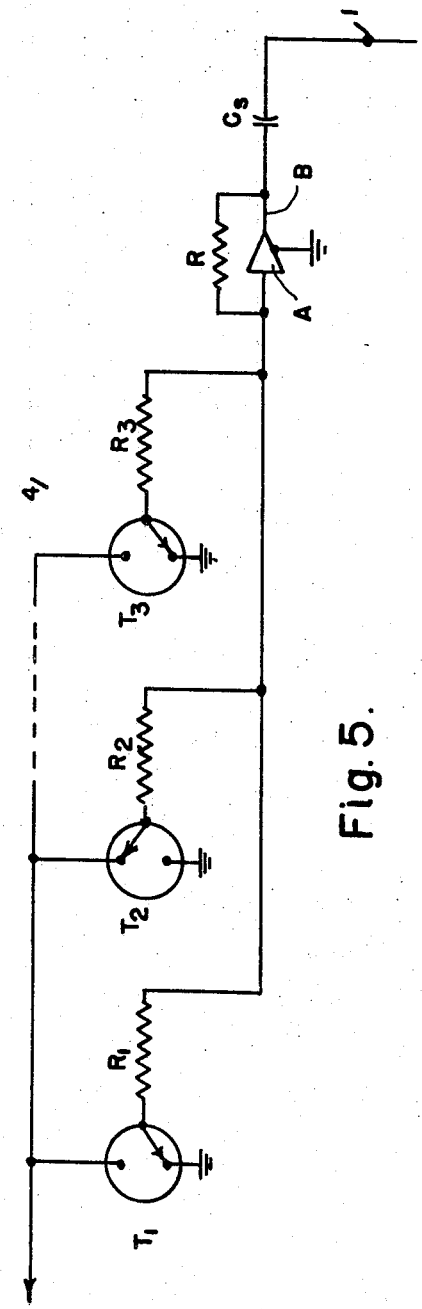

The output voltage at B in FIG. 5 varies in accordance with the number and weighting of switching devices $T_1$, $T_2$...$T_3$, etc., and associated resistors $R_1$, $R_2$...$R_3$, etc., that have been caused to be successively switched by the count of the reversible counter 19.

The voltage at B is developed by applying the cumulative switching-device outputs to a common amplifier A operating with substantial feedback at R to produce high linearity and stability. Through this digital-analogue conversion, the ratio of the alternating-current voltage at B to that of the input to the switching circuits is varied, thus effectively varying the impedance value of the standard capacitance $C_s$ in the bridge circuit, to effect balance.

Figure 6:
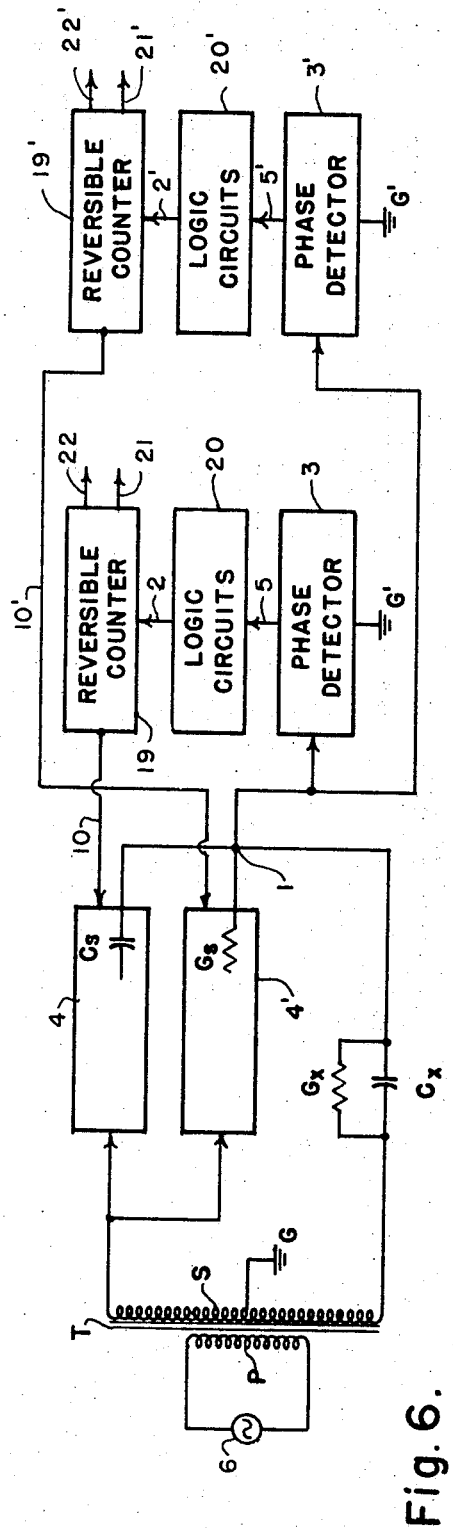
FIGS. 6 and 7 are combined schematic and block diagrams of further modified bridges adapted automatically to measure both capacitance and conductance.

For illustrative purposes, the bridge of FIGS. 1 and 2 has been described in terms of automatic capacitance measurements, though inductance and conductance measurements may also be made, if desired. In the system of FIG. 6, for example, the capacitance bridge measurements of FIGS. 1 and 2 are supplemented by conductance measurements, the unknown conductance $G_x$ being shown in parallel with $C_x$. A digital-to-analogue converter 4' is employed (similar to the converter 4 of FIGS. 2, 3 and 4, but with resistors substituted for the capacitors), with the further phase detector 3' applying a quadrature phase output to a separate set of logic circuits 20' and reversible counter 19', the various connections bearing the same numerals as those of the corresponding connections of the circuit of FIG. 1, but with a prime notation. Independent resolution of quadrature components is thus also achieved.

Figure 7:
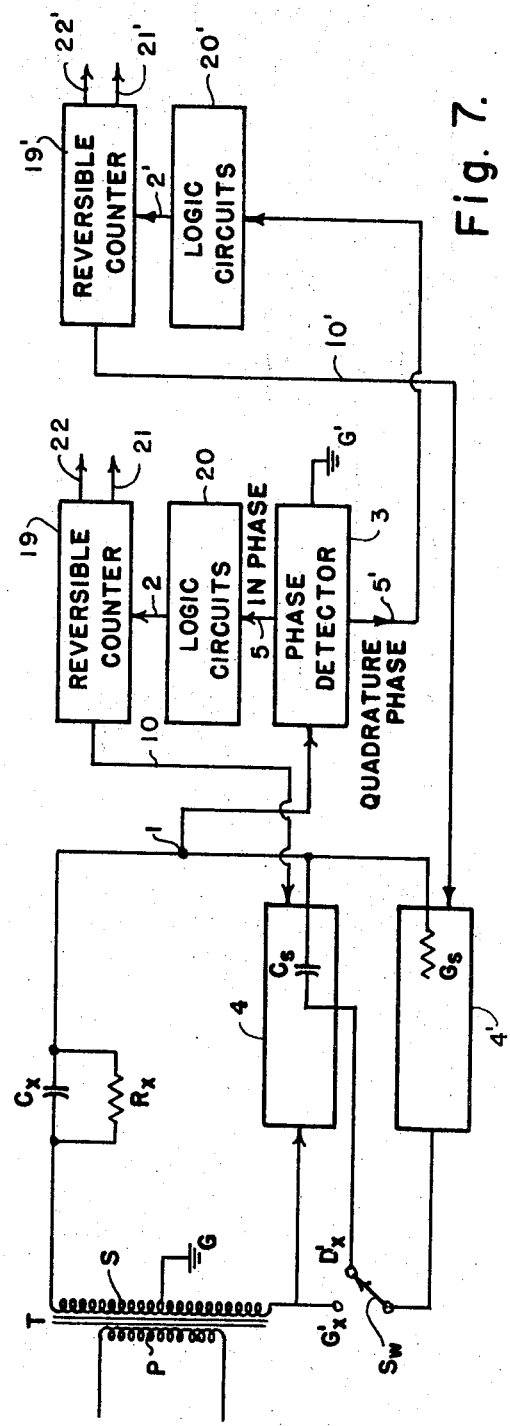

A more specific form of the system of FIG 6 is represented by the embodiment of FIG. 7, wherein the respective capacitance and conductance digital-to-analogue converters 4 and 4' are of the type illustrated in FIG. 5 (with capacitor $C_s$ replaced by a standard conductance $G_r$ for the conductance converters switching circuits).

With switch Sw in the $G_x'$ position, a standard conductance $G_s$, the current through which is adjustable by the switching circuits of converter 4', is connected in parallel with the corresponding capacitance digital-to-analogue converter 4. By means of the same type of operation in the logic system 20' described as occurring with the counter and related circuits of system 20, control of the current through the standard conductance $G_s$ is effected. If desired, moreover, the system 20' may share the same counter 13 as the system 20. In the switch position $G_x'$, with the converter 4' shunting the converter 4, the counter for the system 20' can be calibrated in terms of the conductance $G_x$ of the unknown capacitance. In switch position $D_x'$, however, with the switching circuits and standard conductance 4' in shunt with a portion only of the standard capacitance arm, the counter of the system 20' can be calibrated in terms of the dissipation factor $Gx/\omega Cx$, of the unknown capacitance, where $\omega$ is the frequency.

In actual practice, bridges of the above-described type have been successfully constructed and operated to achieve automatic balancing in the manner described. For a 400 cycle source 6, for example, a capacitance range (parallel connection) from 0.01 pF to 100 $\mu$F can readily be covered; a conductance (parallel) range of from 100 pmho to 1.0 mho; and a direct reading dissipation factor range of from 0.0001 to with 1.00 (100 percent)——all with an accuracy of 0.1 percent of reading for capacitance and conductance, and 1 percent of reading for dissipation factor. With no range changes, automatic balancing can be attained in 0.35 second.

While a particular preferred reversible counter and specific digital-to-analogue circuits have been discussed, it is to be understood that the underlying features of the invention can also be practiced with other types of circuits for achieving similar functions, and that further modifications will also occur to those skilled in the art.

I claim:

1. An automatic impedance bridge having, in combination, a bridge circuit provided with an input and an output, an AC source connected across the input, said bridge circuit comprising unknown and standard impedance bridge arms being of the type in which an unknown impedance is to be measured against a known impedance standard and variations of AC voltage ratios in the bridge arms respectively containing the unknown and standard impedances are used to effect a bridge balance, means connected across the output for detecting the direction of bridge unbalance, logic circuit means connected to and responsive to the detecting means for producing a control signal representing the direction of unbalance, and digital means connected to the logic circuit means and responsive to the control signal for successively changing the voltage ratio of the said standard and unknown impedance bridge arms to reduce successively the degree of bridge unbalance.

2. Bridge apparatus as claimed in Claim 1 and in which the said digital means comprises switching means for successively changing the said voltage ratio.

3. Bridge apparatus as claimed in claim 2 and in which the said switching means successively varies the current passed through the said standard impedance arm.

4. Bridge apparatus as claimed in claim 2 and in which the said switching means successively varies the voltage applied to the said standard impedance arm.

5. Bridge apparatus as claimed in claim 2 and in which the said switching means successively varies the value of standard impedance connected in the said standard impedance arm.

6. Bridge apparatus as claimed in claim 2 and in which the said bridge is of the ratio-transformer type, portions of the transformer serving as other arms of the bridge.

7. Bridge apparatus as claimed in claim 6 and in which the said switching means successively varies the connection of the said standard impedance arm to different points along one of the said other transformer arms of the bridge.

8. Bridge apparatus as claimed in claim 7 and in which the said standard impedance arm comprises the said switching means and a plurality of similar standard impedance elements.

9. Bridge apparatus as claimed in claim 6 and in which the said standard impedance arm comprises the said switching means and a plurality of successively different-valued impedance elements selected thereby.

10. Bridge apparatus as claimed in claim 2 and in which the said digital means further comprises reversible counter means and the detecting means comprises a phase detector.

11. Bridge apparatus as claimed in claim 10 and in which the said switching means and standard impedance comprise a digital-to-analogue converter means for producing either a current through the standard impedance or a voltage in the said standard impedance arm that is the analogue of the count in the reversible counter means.

12. Bridge apparatus as claimed in claim 10 and in which the said logic circuit means comprises control means responsive to the said phase detector for providing a direction-of-count signal to the reversible counter means and for enabling pulses to be applied to the reversible counter means during unbalance.

13. Bridge apparatus as claimed in claim 12 in which said reversible counter means has a plurality of digit stages and in which the said control means comprises the combination of voltage comparator means for comparing the output of the detecting means with a reference, a plurality of gating means connected between the voltage comparator means and the digit stages, respectively of the reversible counter means, clock pulse-producing means connected to the gating means for applying clock pulses to the digit stages of the reversible counter means, and counter means connected to the output of said voltage comparator means for opening said gating means sequentially.

14. Bridge apparatus as claimed in claim 10 and in which means is provided for extracting a binary coded decimal output from the reversible counter means.

15. Bridge apparatus as claimed in claim 10 and in which digital indicating means is connected to the reversible counter means for indicating the value of the said unknown impedance at bridge balance.

16. Bridge apparatus as claimed in claim 2 and in which the said unknown and standard impedances comprise capacitance.

17. Bridge apparatus as claimed in claim 2 and in which the said unknown and standard impedances comprise conductance.

18. Bridge apparatus as claimed in claim 2, said unknown and standard impedance bridge arms including conductance and reactance provided with means for connecting the conductance and reactance of each arm in shunt, further means for detecting bridge unbalance of phase in quadrature relation with that of the first-named detecting means, and additional logic circuit and digital means connected with the further detecting means successively to change the voltage ratio of the said unknown and standard conductance bridge arms to reduce successively the degree of phase-quadrature bridge unbalance.

19. Bridge apparatus as claimed in claim 18 and in which the said additional digital means comprises reversible counter means.

20. Bridge apparatus as claimed in claim 19 and in which the said additional logic circuit means comprises control means responsive to the further detecting means for providing direction-of-count signals to the said reversible counter means and for enabling pulses to be applied to the reversible counter means during unbalance.

21. Bridge apparatus as claimed in claim 20 in which said reversible counter means has a plurality of digit stages and in which the said control means comprises the combination of voltage comparator means for comparing the output of the further detecting means with a reference, a plurality of gating means connected between the voltage comparator means and the digit stages, respectively, of the reversible counter means, clock pulse-producing means connected to the gating means for applying clock pulses to the digit stages of the reversible counter means, and counter means connected to the output of said voltage comparator means for opening said gating means sequentially.

22. Bridge apparatus as claimed in claim 18 and in which the bridge is of the ratio-transformer type, portions of the transformer serving as other arms of the bridge.

23. Bridge apparatus as claimed in claim 22 and in which the said switching means successively varies the connection of the said standard impedance arm to different points along one of said other transformer arms of the bridge.

24. Bridge apparatus as claimed in claim 23 and in which the said standard impedance arm comprises the said switching means and a plurality of similar standard impedance elements.

25. Bridge apparatus as claimed in claim 22 and in which the said standard impedance arm comprises the said switching means and a plurality of successively different-valued impedance elements selected thereby.

26. Bridge apparatus as claimed in claim 18 and in which the switching means of the said second digital means is connected to cause either the successive variation of connection of the said standard conductance arm to different points along one of the said other transformer arms of the bridge or selection in the said standard conductance arm of different conductance elements of a plurality of conductance elements.

27. Bridge apparatus as claimed in claim 18 and in which selective means is provided alternately to connect the said standard conductance arm in shunt with different portions of the said standard impedance arm to enable dissipation factor indications.

28. Bridge apparatus as claimed in claim 13 and in which the reversible counter means counts past balance causing the voltage comparator means to enable the said gating means to permit the feeding of further pulses from said clock-pulse producing means in order to apply successive significant digits of count to the reversible counter means.